US007778159B2

(12) United States Patent
Driscoll et al.

(10) Patent No.: US 7,778,159 B2
(45) Date of Patent: Aug. 17, 2010

(54) HIGH-INTEGRITY SELF-TEST IN A NETWORK HAVING A BRAIDED-RING TOPOLOGY

(75) Inventors: Kevin R. Driscoll, Maple Grove, MN (US); Brendan Hall, Eden Prairie, MN (US); Michael Paulitsch, Columbia Heights, MN (US)

(73) Assignee: Honeywell International Inc., Morristown, NJ (US)

( * ) Notice: Subject to any disclaimer, the term of this patent is extended or adjusted under 35 U.S.C. 154(b) by 206 days.

(21) Appl. No.: 11/863,186

(22) Filed: Sep. 27, 2007

(65) Prior Publication Data

US 2009/0086653 A1    Apr. 2, 2009

(51) Int. Cl.
*H04L 12/28* (2006.01)
(52) U.S. Cl. .................................... 370/217; 370/223
(58) Field of Classification Search ............. 370/217, 370/218, 219, 220, 221, 222, 223, 224, 225, 370/226, 227, 228
See application file for complete search history.

(56) References Cited

U.S. PATENT DOCUMENTS

| 4,417,334 | A | | 11/1983 | Gunderson et al. |
| 4,428,046 | A | | 1/1984 | Chari et al. |
| 4,630,254 | A | | 12/1986 | Tseng |
| 4,631,718 | A | | 12/1986 | Miyao |
| 4,663,748 | A | * | 5/1987 | Karbowiak et al. ......... 370/224 |
| 4,726,018 | A | | 2/1988 | Bux et al. |
| 4,733,391 | A | | 3/1988 | Godbold et al. |
| 4,740,958 | A | | 4/1988 | Duxbury et al. |
| 4,856,023 | A | | 8/1989 | Singh |
| 4,866,606 | A | | 9/1989 | Kopetz |
| 4,905,230 | A | | 2/1990 | Madge et al. |
| 5,132,962 | A | | 7/1992 | Hobgood et al. |
| 5,161,153 | A | | 11/1992 | Westmore |
| 5,235,595 | A | | 8/1993 | O'Dowd |
| 5,235,599 | A | * | 8/1993 | Nishimura et al. ............. 714/4 |
| 5,257,266 | A | | 10/1993 | Maki |
| 5,307,409 | A | | 4/1994 | Driscoll |
| 5,341,232 | A | | 8/1994 | Popp |
| 5,383,191 | A | | 1/1995 | Hobgood et al. |
| 5,386,424 | A | | 1/1995 | Driscoll et al. |
| 5,394,401 | A | | 2/1995 | Patrick et al. |

(Continued)

FOREIGN PATENT DOCUMENTS

AT    407582 B    4/2001

(Continued)

OTHER PUBLICATIONS

Al-Rousan et al., "The Two-Processor Reliability of Hierarchical Larg-Scale Ring-Based Networks", "Proceedings of the 29th Hawaii International Conference on System Sciences", 1996, pp. 63-71.

(Continued)

*Primary Examiner*—Chi H. Pham
*Assistant Examiner*—Kevin Mew
(74) *Attorney, Agent, or Firm*—Fogg & Powers LLC

(57) ABSTRACT

In one embodiment, a node comprises an interface to communicatively couple the node to a plurality of independent communication links. The node changes the mode in which the node operates when the node receives an indicator on a plurality of the independent communication links.

20 Claims, 9 Drawing Sheets

U.S. PATENT DOCUMENTS

| | | | |
|---|---|---|---|
| 5,463,634 A | 10/1995 | Smith et al. | |
| 5,557,778 A | 9/1996 | Vaillancourt | |
| 5,687,356 A | 11/1997 | Basso et al. | |
| 5,715,391 A | 2/1998 | Jackson et al. | |
| 5,742,646 A | 4/1998 | Woolley et al. | |
| 5,896,508 A | 4/1999 | Lee | |
| 5,903,565 A | 5/1999 | Neuhaus et al. | |
| 5,920,267 A | 7/1999 | Tattersall et al. | |
| 5,937,414 A | 8/1999 | Souder et al. | |
| 5,940,367 A | 8/1999 | Antonov | |
| 6,028,837 A * | 2/2000 | Miller | 370/222 |
| 6,052,753 A | 4/2000 | Doerenberg et al. | |
| 6,088,141 A * | 7/2000 | Merli et al. | 398/5 |
| 6,172,984 B1 | 1/2001 | Beyda et al. | |
| 6,175,553 B1 | 1/2001 | Luk et al. | |
| 6,219,528 B1 | 4/2001 | Wright et al. | |
| 6,226,676 B1 | 5/2001 | Crump et al. | |
| 6,240,140 B1 * | 5/2001 | Lindbergh et al. | 375/260 |
| 6,374,078 B1 | 4/2002 | Williams et al. | |
| 6,381,714 B1 * | 4/2002 | Tomita et al. | 714/712 |
| 6,414,953 B1 | 7/2002 | Lamarche et al. | |
| 6,513,092 B1 | 1/2003 | Gorshe | |
| 6,590,863 B1 * | 7/2003 | Nakajima et al. | 370/225 |
| 6,594,802 B1 | 7/2003 | Ricchetti et al. | |
| 6,618,359 B1 | 9/2003 | Chen et al. | |
| 6,707,913 B1 | 3/2004 | Harrison et al. | |
| 6,741,559 B1 | 5/2004 | Smeulderse et al. | |
| 6,760,768 B2 | 7/2004 | Holden et al. | |
| 6,765,924 B1 | 7/2004 | Wu et al. | |
| 6,842,617 B2 | 1/2005 | Williams et al. | |
| 6,925,497 B1 | 8/2005 | Vetrivelkumaran et al. | |
| 6,956,461 B2 | 10/2005 | Yoon et al. | |
| 7,035,539 B2 | 4/2006 | Gumaste | |
| 7,050,395 B1 | 5/2006 | Chow et al. | |
| 7,085,560 B2 | 8/2006 | Petermann | |
| 7,088,921 B1 | 8/2006 | Wood | |
| 7,269,177 B2 | 9/2007 | Baker | |
| 7,304,957 B2 * | 12/2007 | Ngo et al. | 370/241 |
| 7,349,414 B2 | 3/2008 | Sandstrom | |
| 7,372,859 B2 | 5/2008 | Hall et al. | |
| 7,457,303 B2 | 11/2008 | Blumrich et al. | |
| 7,502,334 B2 | 3/2009 | Hall et al. | |
| 2002/0024535 A1 * | 2/2002 | Ueno et al. | 345/736 |
| 2002/0027877 A1 | 3/2002 | Son et al. | |
| 2002/0087763 A1 | 7/2002 | Wendorff | |
| 2002/0118636 A1 | 8/2002 | Phelps et al. | |
| 2003/0002435 A1 | 1/2003 | Miller | |
| 2003/0035530 A1 * | 2/2003 | Mansfield et al. | 379/219 |
| 2003/0067867 A1 | 4/2003 | Weis | |
| 2003/0128984 A1 | 7/2003 | Oberg et al. | |
| 2004/0073698 A1 | 4/2004 | Harter et al. | |
| 2004/0128673 A1 * | 7/2004 | Fuchs et al. | 719/310 |
| 2004/0223515 A1 | 11/2004 | Rygielski et al. | |
| 2004/0258097 A1 | 12/2004 | Arnold et al. | |
| 2005/0002332 A1 | 1/2005 | Oh | |
| 2005/0129037 A1 * | 6/2005 | Zumsteg et al. | 370/404 |
| 2005/0129038 A1 | 6/2005 | Hall et al. | |
| 2005/0132105 A1 | 6/2005 | Hall et al. | |
| 2005/0135277 A1 | 6/2005 | Hall et al. | |
| 2005/0135278 A1 | 6/2005 | Hall et al. | |
| 2005/0152377 A1 | 7/2005 | Hall et al. | |
| 2005/0152379 A1 | 7/2005 | Hall et al. | |
| 2005/0169296 A1 | 8/2005 | Katar et al. | |
| 2005/0198280 A1 | 9/2005 | Hall et al. | |
| 2006/0039301 A1 * | 2/2006 | Tsuji et al. | 370/258 |
| 2006/0077981 A1 | 4/2006 | Rogers | |
| 2006/0203851 A1 | 9/2006 | Eidson | |
| 2007/0253327 A1 * | 11/2007 | Saha et al. | 370/218 |
| 2008/0010705 A1 | 1/2008 | Quaid et al. | |
| 2008/0080551 A1 | 4/2008 | Driscoll et al. | |
| 2008/0144526 A1 | 6/2008 | Hall et al. | |
| 2008/0144668 A1 | 6/2008 | Hall et al. | |
| 2010/0003979 A1 * | 1/2010 | Iwamura et al. | 455/436 |

FOREIGN PATENT DOCUMENTS

| | | |
|---|---|---|
| DE | 3238692 | 4/1984 |
| DE | 19633744 | 2/1998 |
| DE | 20220280 | 11/2003 |
| EP | 0405706 | 2/1990 |
| EP | 1280024 | 1/2003 |
| EP | 1280312 | 1/2003 |
| EP | 1365543 | 11/2003 |
| EP | 1398710 | 3/2004 |
| EP | 1469627 | 10/2004 |
| GB | 2028062 | 2/1980 |
| GB | 1581803 | 12/1980 |
| GB | 2175775 | 12/1986 |
| WO | 0064122 | 10/2000 |

OTHER PUBLICATIONS

"Backplane Data Bus ARINC Specification 659", Dec. 1993, pp. 1-132, Publisher: ARINC.

Avizienis, "A Fault Tolerance Infrastructure for Dependable Computing With High-Performance COTS Componenets", "Conference Proceedings on Dependable Systems and Networks", Jun. 2000, pp. 492-500, Publisher: IEEE, Published in: New York, NY.

Bauer et al., "Assumption Coverage Under Different Failure Modes in the Time-Triggered Architecture", "8th IEEE International Conference on Emerging Technologies and Factory Automation", Oct. 2001, pp. 333-341, Publisher: IEEE.

Bauer et al., "Transparent Redundancy in the Time-Triggered Architecture", "Proceedings of the Conference on Dependable Systems and Networks", 2000, pp. 5-13, Publisher: IEEE.

Bauer et al., "The Central Guardian Approach to Enforce Fault Isolation in a Time-Triggered System", "Proceedings of Symposium on Autonomous Decentralized Systems", Apr. 2003, pp. 37-44, Publisher: IEEE.

Bosch, "Can Specification Version 2.0", "SAE Handbook—Parts and Components", 1998, pp. 1-72, vol. 2, Publisher: Society of Automotive Engineers.

D'Luna, "A Single-Chip Universal Cable Set-Top Box/Modern Transceiver", "Journal of Sold-State Circuits", Nov. 1998, pp. 1647-1660, vol. 34, No. 11, Publisher: IEEE.

Driscoll et al., "The Real Byzantine Generals", "Proceedings of Digital Avionics System Conference", Oct. 2004, pp. 6.D.4-1-6.D.4-11, Publisher: IEEE.

Brinkmeyer, "Flexray International Workshop Slides", "www.flexray-group.com", Apr. 2002, pp. 1-356, Publisher: Flexray.

"Flexray Communication System: Protocol Specification Version 2.1 Revision A", "www.flexray-group.com", Mar. 2006, pp. 1-8, Publisher: Flexray Consortium.

"Preliminary Node-Local Bus Guardian Specification Version 2.0.9", Dec. 2005, pp. 1-75, Publisher: Flexray Consortium.

"Preliminary Central Bus Guardian Specification Version 2.0.9", Dec. 2005, pp. 1-38, Publisher: Flexray Consortium.

Grnarov et al., "A Highly Reliable Distributed Loop Network Architecture", "Proceedings of Fault-Tolerant Computing Symposium", Jun. 1980, pp. 319-324, Publisher: IEEE.

Gruenbacher, "Fault Injection for TTA", 1999, Publisher: Information Society Technologies.

Hall et al., "Ringing Out Fault Tolerance a New Ring Network for Superior Low-DOST Dependabilitiy", "International Conference on Dependable Systems and Networks (DSN'05)", 2005, pp. 298-307.

Hammett et al., "Achieving 10-9 Dependability With Drive-By-Wire Systems", "SAE World Congress", 2003, pp. 534-547, vol. 112, No. 7, Publisher: Society of Automotive Engineers.

Hopper et al., "Design and Use of an Integrated Cambridge Ring", "Journal on Selected Areas in Communications", Nov. 2003, pp. 775-784, vol. 1, No. 5, Publisher: IEEE.

Hoyme et al., "SAFEbus", "Proceedings of the Digital Avionics Systems Conference", Oct. 1992, pp. 68-73, Publisher: IEEE.

Hoyme et al., "SAFEBUS", "IEEE Aerospce and Electronics Systems Magazine", Mar. 1993, pp. 34-39, vol. 8, No. 3, Publisher: IEEE.

Huber et al., "Silk: An Implementation of a Buffer Insertion Ring", "Journal on Selected Areas in Communications", Nov. 1983, pp. 766-774, vol. 1, No. 5, Publisher: IEEE.

Hwang et al., "Survival Reliability of Some Double-Loop Networks and Chordal Rings", "Transactions on Computers", 1995, pp. 1468-1471, vol. 44, No. 12, Publisher: IEEE.

"Internet Content Adaptation", "Network Appliance", Jul. 2001, pp. 1-13.

Johansson et al., "On Communication Requirements for Control-By-Wire Applications", "Proceedings of System Safety Conference", Aug. 2003, pp. 1123-1132.

Kanoun et al., "Dependability Evaluation of Bus and Ring Communication Topologies for the Delta-4 Distr Fault-Tolerant Architecture", "Proceedings of the Symposium on Reliable Distributed Systems", 1991, pp. 130-141, Publisher: IEEE.

Kieckhafer et al., "The MAFT Architecture for Distributed Fault Tolerance", "Transactions on Computers", 1988, pp. 398-405, vol. 37, No. 4, Publisher: IEEE.

Kopetz et al., "TTP—A Protocol for Fault-Tolerant Real-Time Systems", "Computer", Jan. 1194, pp. 14-23, vol. 27, No. 1, Publisher: IEEE Computer Society, Published in: Long Beach, CA.

Liu et al., "The Distributed Double-Loop Computer Network (DDLCN)", "ACM '80 Proceedings of the ACM 1980 Annual Conference", 1980, pp. 164-178, Publisher: ACM.

Lonn, "Initialsynchronization of TDMA Communication in Distributed Real-Time Systems", "Conference on Distributed Computing Systems", 1999, pp. 370-379, Publisher: IEEE.

Nayak et al., "Ring Reconfiguration in Presence of Close Fault Cuts", "Proceedings of Hawaii International Conference on System Science", 1996, pp. 422-428, Publisher: IEEE.

Paulitsch et al., "Cverage and the Use of Cyclic Redundancy Codes in Ultra-Dependable Systems", "2005 International Conference on Dependable Systems and Networks (DSN'05)", 2005, pp. 346-355.

Poledna et al., "Replica Determinism and Flexible Scheduling in Hard Real-Time Dependable Systms", "IEEE Transactions on Computers", Feb. 2000, pp. 100-111, vol. 49, No. 2, Publisher: IEEE.

Poledna, "Replica Determinism in Distributed Real-Time Systems: A Brief Survey", "Real-Time Systems", 1994, pp. 289-316, vol. 6.

"Software Considerations in Airborne Systems and Equipment Certification", "http://www.rtca.org", Dec. 1992, pp. 1-112, Publisher: RTCA.DO-178b.

Rushby, "Bus Architectures for Safety-Critical Embedded Systems, Embedded Software", "Proceedings of 1st International Workshop on Embedded Software, Notes in Computer Science", Oct. 2001, pp. 306-323, vol. 2211, Publisher: Springer-Verlag, Published in: Germany.

Saltzer et al., "Why a Ring", "Proceedings of Symposium on Data Communications", 1981, pp. 211-217, Publisher: IEEE.

Sivencrona et al., "Protocol Membership Agreement in Distributed Communicaiton System—A Question of Brittleness", "SAE World Congress, Paper No. 2003-01-0108", 2003, pp. 1-6, Publisher: Society of Automotive Engineers Inc.

Steiner et al., "The Startup Problem in Fault-Tolerant Time-Triggered Communication", "International Conference on Dependable Systems and Networks (DSN'06)", 2006, pp. 35-44.

Steiner et al., "The Transition From Asynchronous to Synchronous System Operation: An Approach From Distributed Fault-Tolerant Systems", "Proceedings of Conference on Distributed Computing Systems", Jul. 2002, pp. 329-336, Publisher: IEEE.

Sundaram et al., "Controller Integrity in Automotive Failsafe System Architectures", "2006 SAE World Congress", 2006, pp. 1-10, Publisher: SAE International.

Tomlinson et al., "Extensible Proxy Services Framework", Jul. 2000, pp. 1-13, Publisher: Internet Society.

"Time-Triggered Protocol TTP/C", 2004, Publisher: TTTECH Computertechnik GmbH, Published in: Austria.

Wensley et al., "The Design, Analysis, and Verification of the Sift Fault Tolerant System", "Proceedings of Conference on Software Engineering", 1976, pp. 458-469, Publisher: IEEE Computer Society Press.

Yeh, "Design Condiserations in Boeing 777 Fly-By-Wire Computers", "High-Asssurance Systems Engineering Symposium", Nov. 1998, pp. 64-72, Publisher: IEEE.

Yeh, "Triple-Triple Redundant 777 Primary Flight Computer", "Proceedings of the Aerospace Applications Conference", 1996, pp. 293-307, vol. 1, Publisher: IEEE, Published in: New York, NY.

Hall et al., "Message Error Verification Using CRC With Hidden Data", Nov. 19, 2003, U.S. Appl. No. 60/523,865.

Hall et al., "A Braided Ring Topology for a Communication Network", Nov. 19, 2003, U.S. Appl. No. 60/523,892.

IEEE Computer Society, "1149.6 IEEE Standard for Boundary-Scan Testing of Advanced Digital Networks", Apr. 17, 2003, pp. 1-139, Publisher: IEEE, Published in: New York, NY.

* cited by examiner

HIGH-INTEGRITY SELF-TEST IN A NETWORK HAVING A BRAIDED-RING TOPOLOGY

CROSS-REFERENCE TO RELATED APPLICATIONS

This application is related to: U.S. patent application Ser. No. 10/993,933, titled "HIGH INTEGRITY DATA PROPAGATION IN A BRAIDED RING" (which is also referred to here as the "'933 application" and which is hereby incorporated herein by reference) and U.S. patent application Ser. No. 11/010,249, titled "SELF-CHECKING PAIR ON A BRAIDED RING NETWORK" (which is also referred to here as the "'249 application" and which is hereby incorporated herein by reference) both of which were filed on Nov. 19, 2004. The '933 application claims the benefit of U.S. Provisional Application No. 60/523,892, filed on Nov. 19, 2003, and U.S. Provisional Application No. 60/523,865, filed on Nov. 19, 2003, both of which are also incorporated herein by reference.

This application is also related to: U.S. patent application Ser. No. 11/537,305, titled "SYSTEMS AND METHODS FOR FAULT-TOLERANT HIGH INTEGRITY DATA PROPAGATION USING A HALF-DUPLEX BRAIDED RING NETWORK", filed on Sep. 29, 2006 (which is also referred to here as the "'305 application" and which is hereby incorporated herein by reference).

BACKGROUND

Some communication systems are used in applications where a high degree of integrity is desired (also referred to here as "high-integrity applications"). Often, nodes included in such a system include functionality to prevent, detect, and/or correct faults that occur at that node. Examples of such functionality (also referred to here as "covering functions") include watch-dogs, bus guardians, and protection monitoring systems (for example, to provide over-speed or over-temperature protection). It is typically desirable, given the criticality of such functionality, to periodically test such functionality while such a node is deployed, (for example, in order to detect latent "stuck-at-good" faults). Such testing is also referred to here as "in-field testing" or "fault detection, isolation, and recovery (FDIR) scrubbing." One type of in-field testing is performed by software executing on a node. Though such in-field testing software is adequate to test functionality that is local to a given node (for example, watch-dogs), such software is typically not sufficient to stimulate functionality that is not local to the node (for example, functionality that is externally influenced, such as bus guardians or communication protocols).

Also, where a node includes "offline" functionality or modes that can be activated while the node is deployed (for example, a test mode or a software or data download mode) and activation of such offline functionality or modes stops or otherwise impairs the normal operation of the node, it is typically desirable to avoid inadvertently activating such offline functionality or modes. This is especially true where such a node is used in a safety-critical application.

SUMMARY

In one embodiment, a node comprises an interface to communicatively couple the node to a plurality of independent communication links. The node changes the mode in which the node operates when the node receives an indicator on a plurality of the independent communication links.

In another embodiment, a method is performed at a node. The method comprises determining if the node has received an indicator on a plurality of independent communication links to which the node is communicatively coupled and changing the mode in which the node operates when the node receives the indicator on the plurality of independent communication links.

In another embodiment, a network comprises a plurality of nodes that are communicatively coupled to one another over first and second channels. The first channel communicatively couples each node to: a respective first direct link that is communicatively coupled to a respective first neighbor node of that node in a first direction, a respective first skip link that is communicatively coupled to a respective first neighbor's neighbor node of that node in the first direction; a respective second direct link that is communicatively coupled to a respective second neighbor node of that node in a second direction, and a respective second skip link that is communicatively coupled to a respective second neighbor's neighbor node of that node in the second direction. The second channel communicatively couples each node to: a respective third direct link that is communicatively coupled to the respective first neighbor node of that node in the first direction, a respective third skip link that is communicatively coupled to the respective first neighbor's neighbor node of that node in the first direction, a fourth direct link that is communicatively coupled to the second respective neighbor node of that node in the second direction, and a fourth skip link that is communicatively coupled to the respective second neighbor's neighbor node of that node in the second direction. Each node further comprises: a first pass-through link that communicatively couples the respective first direct link of that node to the respective second skip link of that node and a second pass-through link that communicatively couples the respective third direct link of that node to the respective fourth skip link of that node. For each node, a respective first cable couples that node to the respective first neighbor node of that node and comprises the respective first direct link, the respective first skip link, the respective third direct link, and the respective third skip link and a respective second cable couples that node to the respective second neighbor node of that node and comprises the respective second direct link, the respective second skip link, the respective fourth direct link, and the respective fourth skip link.

The details of various embodiments of the claimed invention are set forth in the accompanying drawings and the description below. Other features and advantages will become apparent from the description, the drawings, and the claims.

DRAWINGS

Like reference numbers and designations in the various drawings indicate like elements.

DETAILED DESCRIPTION

Figure 1:
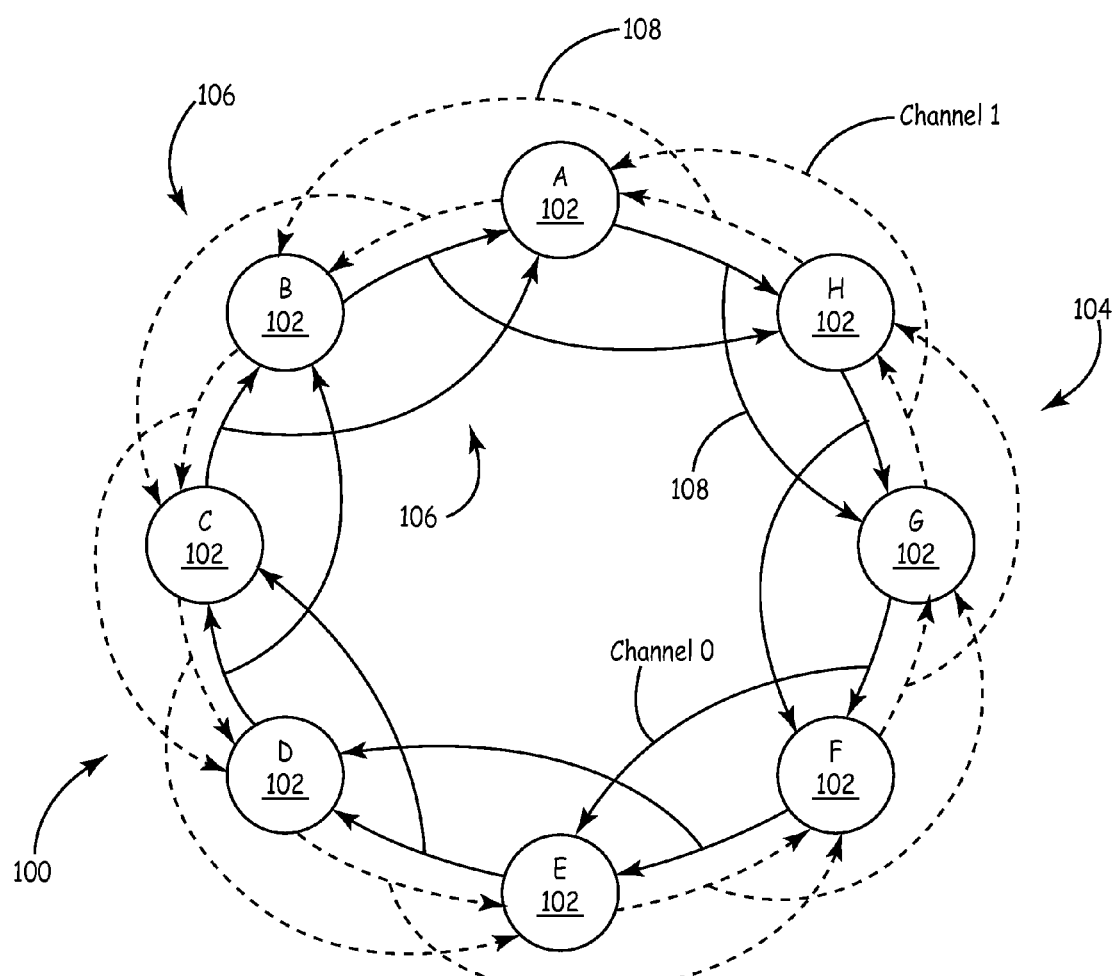
FIG. 1 is a block diagram of one embodiment of a communication network.

FIG. 1 is a block diagram of one embodiment of a communication network 100. Communication network 100 includes multiple nodes 102. Each node 102 of the network 100 is communicatively coupled to at least one channel 106. For a given direction in which data flows in the channel 106, the channel 106 directly communicatively couples (that is, with only one hop) each node 102 to at least two other nodes 102 from which that node 102 receives data (also referred to here as "receive-from nodes") and to at least two other nodes 102 to which that node 102 transmits data (also referred to here as the "transmit-to nodes"). In one embodiment, one of the receive-from nodes 102 is designated as a "primary" receive-from node 102 and the other receive-from nodes 102 are designated as "secondary" receive-from nodes 102. When a node 102 "relays" data on a channel 106 in a given direction, that node 102 receives data from the primary receive-from node 102 for that channel 106 and direction and forwards the received data on to each of the transmit-to nodes designated for that node 102 for that channel 106 and direction. Data received by a node from the secondary receive-from nodes 102 is used for the various comparison operations described below and/or is relayed in the event that suitable data is not received from the primary receive-from node. When a given node 102 "transmits" data (that is, when the given node 102 is the source of data communicated on the network 100) along a channel 106 in a given direction, that node 102 transmits the data to each of the transmit-to nodes 102 designated for that node 102 for that channel 106 and direction.

In the particular embodiment shown in FIG. 1, the nodes 102 are arranged in a ring 104 having a "braided ring" topology in which the nodes 102 communicate with one another over multiple communication channels 106. In the particular embodiment shown in FIG. 1, eight nodes 102 communicate with one another over two replicated communication channels 106. In other embodiments, a different number and/or type of nodes 102 and/or channels 106 and/or a different network topology are used.

Embodiments of network 100 typically support at least two modes of operation. One mode of operation is a "normal" mode of operation in which data is communicated over the network 100 using a particular media access scheme. For example, the embodiment shown in FIG. 1 is described here as being implemented using a normal mode of operation that supports a time division multiple access (TDMA) media access scheme (for example, a time-triggered, table-driven architecture). In other embodiments, other media access schemes are used in the normal mode of operation. While operating in normal mode, a node 102 does not perform any "special" processing that is associated with another mode of operation.

The other modes of operation can include, for example, "offline" modes of operation in which all of the nodes 102 in the network 100 do not perform the normal-mode processing they would otherwise perform and instead operate in a special mode. Examples of offline modes include an offline test mode (in which one or more test operations are performed) and/or an offline software or data download mode (in which one or more items of software or data is downloaded to one or more nodes 102 of the network 100).

Other, non-normal modes of operation also include "online" modes of operation in which all of the nodes 102 in the network 100 perform special processing in addition to the normal mode processing they otherwise would perform while operating in their respective normal mode of operation. Data related to the special processing is communicated on the network 100 along with any normal-mode data. Examples of how this would be accomplished include storing such special data in the header and/or payload of the normal-mode data (for example, using an embedded management or operations channel, field, register, or flag included in each normal-mode frame or message), and/or by otherwise dedicating a portion of the available communication capacity to such special data using, for example, dedicated time slots, channels, frequencies, portions of the available code space, etc.). One example of such an online special mode is a background debug mode in which a host processor included in the relevant node can be caused to show or set the state of various registers or memory coupled to the processor and/or modify or control the operation of the processor, for example, by setting breakpoints, watchpoints, and catchpoints that halt operation of the processor and/or by permitting the processor to be "single stepped."

Also, in some embodiments, the nodes 102 in the network 100 are not all operating in the same mode. For example, in one usage scenario, some of the nodes 102 are operating in normal mode while some of the other nodes 102 are operating in a different mode (for example, an online special mode such as a background debug mode or an offline mode in which the offline node relays any data that is not intended for that node). In one example of such a usage scenario, the nodes operating in normal mode communicate using a TDMA scheme in the normal manner while the nodes operating in a different node communicate either during one or more time slots dedicated to those nodes or during other portions of a TDMA round in which data is not normally communicated.

The eight nodes 102 shown in FIG. 1 are also individually labeled in FIG. 1 with the letters A through H and are also referred to here individually as "node A," "node B," and so forth. As used herein, a "neighbor node" (or just "neighbor") is a node that is immediately next to a given node 102 in the ring 104. Each node 102 has two neighbor nodes 102, one in the clockwise direction (also referred to here as the "clockwise neighbor node" or "clockwise neighbor") and one in the counter-clockwise direction (also referred to here as the "counter-clockwise neighbor node" or "counter-clockwise neighbor"). For example, the neighbor nodes 102 for node A are node H in the clockwise direction and node B in the counter-clockwise direction.

In addition, as used herein, a "neighbor's neighbor node" (or just "neighbor's neighbor") for a given node 102 is the neighbor node 102 of the neighbor node 102 of the given node 102. Each node 102 has two neighbor's neighbor nodes 102, one in the clockwise direction (also referred to here as the "clockwise neighbor's neighbor node" or "clockwise neighbor's neighbor") and one in the counter-clockwise direction (also referred to here as the "counter-clockwise neighbor's neighbor node" or "counter-clockwise neighbor's neighbor"). For example, the two neighbor's neighbor nodes for node A are node G in the clockwise direction and node C in the counter-clockwise direction.

The two communication channels 106 are individually labeled in FIG. 1 (and are also referred to here) as "channel 0" and "channel 1" respectively. In the embodiment shown in FIG. 1, each of the channels 106 is formed using multiple point-to-point, unidirectional serial links 108. Channel 0 interconnects the node 102 in the clockwise direction around the ring 104 and channel 1 interconnects the nodes 102 in the counter-clockwise direction around the ring 104.

As used here, when a link 108 is described as being connected "from" a first node 102 "to" a second node 102, the link 108 provides a communication path for the first node 102 to send data to the second node 102 over the link 108. That is, the direction of that unidirectional link 108 is from the first node 102 to the second node 102.

A link 108 is connected from each node 102 to that node's clockwise neighbor node 102. A link 108 is also connected from each node 102 to that node's clockwise neighbor's neighbor node 102. For example, a link 108 is connected from node A to node H and a link 108 is connected from node A to node G. These clockwise links 108 make up channel 0 and are shown in FIG. 1 using solid lines.

A link 108 is connected from each node 102 to that node's counter-clockwise neighbor node 102. A link 108 is also connected from each node 102 to that node's counter-clockwise neighbor's neighbor node 102. For example, a link 108 is connected from node A to node B and a link 108 is connected from node A to node C. These counter-clockwise links 108 make up channel 1 and are shown in FIG. 1 using dashed lines.

The links 108 that connect a given node 102 to that node's respective clockwise and counter-clockwise neighbor nodes are also referred to here as "direct" links 108. The links 108 that connect a given node 102 to that node's respective clockwise and counter-clockwise neighbor's neighbors are referred to here as "skip" links 108.

In the particular embodiment shown in FIG. 1, for channel 0, the receive-from nodes for each node 102 are that node's counter-clockwise neighbor and counter-clockwise neighbor's neighbor and the transmit-to nodes for each node 102 are that node's clockwise neighbor and clockwise neighbor's neighbor. In the embodiments described herein, the primary receive-from node is node's counter-clockwise neighbor (though in other embodiments, the primary receive-from node is the node's counter-clockwise neighbor's neighbor). In the particular embodiment shown in FIG. 1, for channel 1, the receive-from nodes for each node 102 are that node's clockwise neighbor and clockwise neighbor's neighbor and the transmit-to nodes for each node 102 are that node's counter-clockwise neighbor and counter-clockwise neighbor's neighbor. In the embodiments described herein, the primary receive-from node is node's clockwise neighbor.

Although the embodiment shown in FIG. 1 is implemented using two physical channels that are implemented using separate unidirectional links, other types of links are used in other embodiments (for example, bidirectional links). For example, in one alternative embodiment, the network is implemented using a half-duplex braided ring topology. In such an embodiment, each node in the ring is communicatively coupled to its clockwise neighbor, clockwise neighbor's neighbor, counter-clockwise neighbor, and counter-clockwise neighbor's neighbor using a respective, single bi-directional serial link. In such an embodiment, two logical channels are used to communicate data over the same physical links. A logical first channel is defined as the path traveled by data propagating in the clockwise direction around the ring, and a logical second channel is defined as the path traveled by data propagating in the counter-clockwise direction around the ring. Both the first channel and the second channel utilize the same set of bidirectional serial links to propagate data, although any one link can only be utilized to propagate data in a single direction at a given point in time. One such embodiment of a half-duplex braided ring network is described in the '305 application.

In the particular embodiment shown in FIG. 1, the network 100 is implemented as a peer-to-peer network in which each transmission is intended to be received by each node 102 of the network 100. In other embodiments, each transmission is intended for a particular destination node. Moreover, in the embodiments described here, data are communicated in the network 100 in the form of frames of data though it is to be understood that, in other embodiments, other units of data are communicated over the network 100.

The '933 application and the '249 application describe various embodiments of processing that can be performed in the embodiment of network 100 shown in FIG. 1 when the nodes 102 are operating in a "normal" mode (that is, a non-testing mode). FIGS. 3-6 describe various embodiments of processing performed in the embodiment of network 100 shown in FIG. 1 related to the initiation and execution of an offline mode of operation (for example, an offline test mode or an offline software or data download mode).

Figure 2:
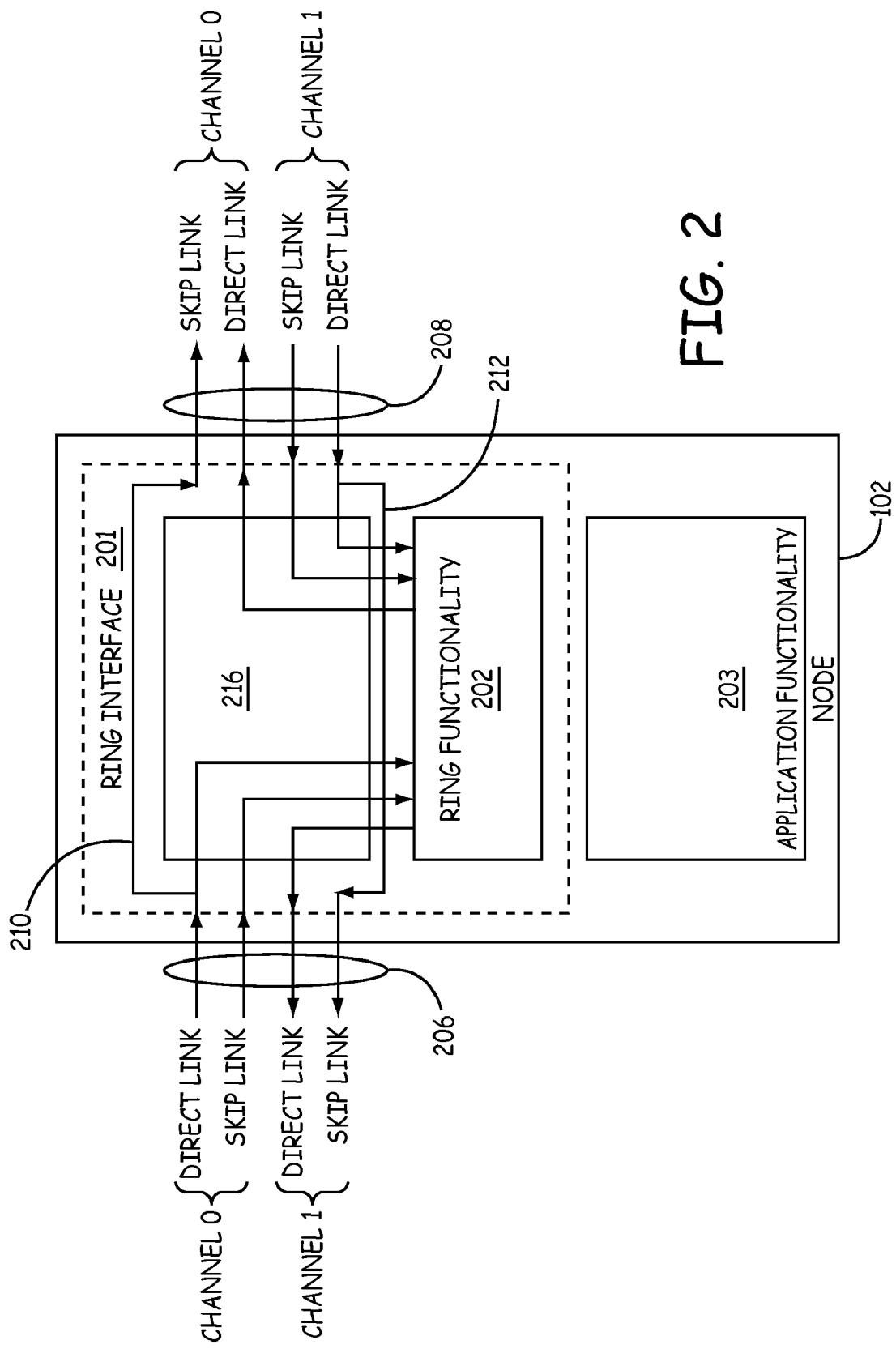
FIG. 2 is a block diagram of one embodiment of a node that implements such a single-cable connection scheme.

In FIG. 1, for the purposes of illustration, each skip link 108 in channel 0 is depicted as going from a respective source node 102 to the source node's clockwise neighbor's neighbor and each skip link 108 in channel 1 is depicted as going from a respective source node 102 to the source node's counter-clockwise neighbor's neighbor. In one embodiment, however, each skip link 108 in channel 0, which goes from a respective source node to the source node's clockwise neighbor's neighbor, "passes through" the source node's clockwise neighbor (without any processing being performed by the clockwise neighbor on the data communicated on that skip link 108) and each skip link 108 in channel 1, which goes from a respective source node to the source node's counter-clockwise neighbor's neighbor, "passes through" the source node's counter-clockwise neighbor (without any processing being performed by the counter-clockwise neighbor on the data communicated on that skip link 108). In this way, a single cable can be used to couple each node to its clockwise neighbor and a single cable can be used to couple that node to its counter-clockwise neighbor. FIG. 2 is a block diagram of one embodiment of a node 102 that implements such a single-cable connection scheme suitable for use in the network 100 of FIG. 1. Such a node 102 is referred to here in the context of FIG. 2 as the "current" node 102. The embodiment of the node 102 shown in FIG. 2 is suitable for use in the network 100 of FIG. 1.

The current node 102 comprises application functionality 203 that implements the application-specific functionality supported by the current node 102. In one implementation, the application functionality 203 comprises a programmable processor that executes application software (in addition to appropriate software to interact with the ring functionality 202). The current node 102 comprises a ring interface 201 that serves as the interface between the application functionality 203 and channels 0 and 1 of the network 100 (more specifically, the particular links 108 of those channels). The ring interface 201 comprises ring functionality 202 that performs the normal-mode ring-related processing described in the '933 application and the '249 application.

In the particular embodiment shown in FIG. 2, the current node's counter-clockwise direct links 108 and skip links 108 for both channels 0 and 1 are included in a single cable 206 that is connected to the counter-clockwise neighbor node of the current node 102. The single cable 206 is also referred to here as the "counter-clockwise cable." Likewise, the current node's clockwise direct links 108 and skip links 108 for both channels 0 and 1 are included in a single cable 208 that is connected to the clockwise neighbor node of the current node 102. The single cable 208 is also referred to here as the "clockwise cable."

In such an embodiment, the current node 102 comprises a pass-through link 210 that couples the counter-clockwise direct link 108 of channel 0 to the clockwise skip link 108 of channel 0 and a pass-through link 212 that couples the clockwise direct link 108 of channel 1 to the counter-clockwise skip link 108 of channel 1. In this way, the current node's counter-clockwise neighbor is communicatively coupled to the current node's clockwise neighbor via channel 0 and the current node's clockwise neighbor is communicatively coupled to the current node's counter-clockwise neighbor via channel 1. In such an embodiment, the single-cable connection scheme is used with each such node 102 in the network 100 of FIG. 1 to connect that node 102 to its counter-clockwise neighbor using a single cable and to connect that node 102 to its clockwise neighbor using a single cable, which typically reduces the amount of physical wiring that is needed to implement the network topology of FIG. 1.

In such an embodiment, the ring interface 201 comprises interface logic 216 that selectively couples the various links 108 of the current node 102 to the ring functionality 202. Such selectively coupling can be implemented in various ways including for example the use of switches, relays, and the like. The logical connections established by the interface logic 216 while the current node 102 is operating in "normal mode" are shown in FIG. 2. As shown in FIG. 2, the counter-clockwise direct link 108 and skip link 108 of channel 0 are communicatively coupled to channel-zero direct and skip inputs, respectively, of the node functionality 202 and a channel-zero output of the node functionality 202 is communicatively coupled to the clockwise direct link 108 of channel 0. Likewise, as shown in FIG. 2, the clockwise direct link 108 and skip link 108 are communicatively coupled to channel-one direct and skip inputs, respectively, of the node functionality 202 and a channel-one output of the node functionality 202 is communicatively coupled to the counter-clockwise direct link 108 of channel 1.

Figure 3:
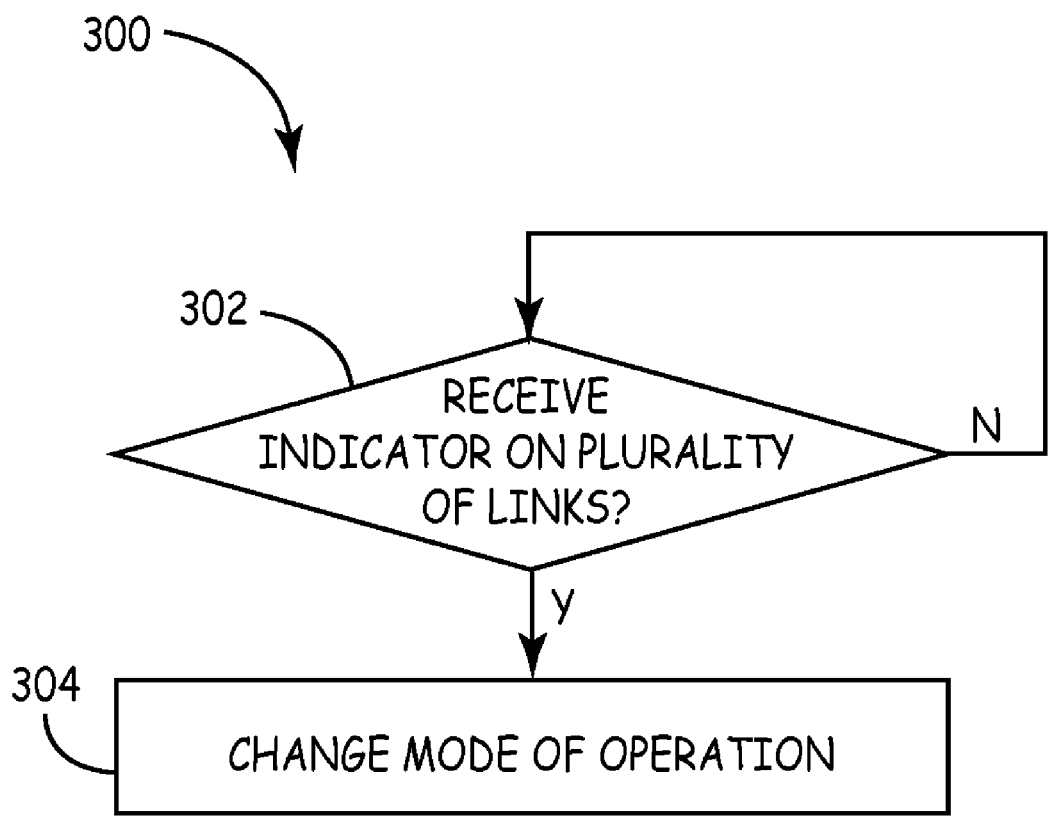
FIG. 3 is a flow-diagram of one embodiment of a method of determining when to change an operational mode of a node.

FIG. 3 is a flow diagram of one embodiment of a method 300 of determining when to change an operational mode of a node in a fault-tolerant manner. The embodiment of method 300 shown in FIG. 3 is described here as being implemented using the network 100 and nodes 102 described above in connection with FIG. 1. Method 300 is performed by one or more such nodes 102 and, in the context of FIG. 3, the node 102 that is performing the processing of method 300 is referred to here as the "current" node 102. In one embodiment, at least a portion of the functionality described here as being performed by the current node 102 is implemented in a controller included in the node 102. Other embodiments of method 300 are implemented in other ways (for example, in networks that make use of other fault-tolerant network topologies).

When the current node 102 receives a predetermined indicator on a plurality of independent links (checked in block 302), the current node 102 changes the mode in which it operates in the manner associated with the received indicator (block 304). Otherwise, the current node 102 remains in its current operational mode (for example, in a normal mode). In one implementation of such an embodiment, the indicator must be received on each of the plurality of independent links within a given period of time in order for the node 102 to change the mode in which it operates. In such an implementation, if the indicator is received on one of the links but the indicator is not received on one or more of the other links during that time period, the node does not change its operational mode in the manner associated with that indicator. In one example, the period of time is defined as the current time slot. In another example, when the indicator is first received on a first link, the indicator must be received on the other links within a particular "timeout" period that is measured from the receipt of the indicator on the first link.

In some implementations of such an embodiment, the indicator must be received on a specific set of independent links before the node changes its operational mode. For example, in one such implementation that employs the network 100 of FIG. 1, the indicator must be received on the direct link 108 and the skip link 108 of both of the channels 0 and 1 before changing the operational mode of the node 102. In another implementation, the indicator must be received on both the direct link 108 and the skip link 108 of channel 0 before changing the operational mode of the node 102. In some other implementations, the indicator must be received on a minimum number of independent links but need not be received on specific, predefined set of links before the node changes its operational mode. For example, in one such implementation that employs the network 100 of FIG. 1, the indicator must be received on both the direct link 108 and the skip link 108 of channel 0 or both the direct link 108 and the skip link 108 of channel 1 before changing the operational mode of the node 102.

In some implementations of such an embodiment, additional authentication or verification is performed before the mode of operation is changed. For example, in one such implementation, change-mode indicators, to be valid, must be sourced from a "self-checking pair." As self-checking pair comprises a pair of nodes that are scheduled to act as self-checking pair as is described in the '249 application. In such an embodiment, each such self-checking pair is intended to operate in a replica-deterministic fashion at the application layer such that the output of both members of the self-checking pair is bit-for-bit identical. When a message is sourced from a self-checking pair, if a node 102 receives the same message on both its direct link 108 and skip link 108 of the same channel, the receiving node 102 knows that the message was sourced from the two member nodes of a self-checking pair because of the relay and/or guardian processing described in the '249 application. In the event that a receiving node 102 receives such a message on only one of its direct link 108 and skip link 108 for channel 0 and only one of its direct link 108 and skip link 108 for channel 1, the receiving node 102 cannot assume that the message was sourced from a self-checking pair without performing an additional authentication or verification check.

One example of such an authentication or verification check makes use of a "hop count" field that is included in each message. The hop count field is set to zero by the node 102 that originates each message. Then, each node 102 that receives and relays the message updates the hop count. Each such node 102 increments the hop count field by one if that node 102 received the same message on both a direct and skip link of the relevant channel, resets the hop count field to one if the message is received by that node 102 on only its direct link for the relevant channel, and resets the hop count field to two if the message is received by that node 102 on only its skip link for the relevant channel.

The hop count field is used to determine by a receiving node 102 that receives a message on only one of its direct link 108 and skip link 108 for channel 0 and only one of its direct link 108 and skip link 108 for channel 1. The receive node 102 adds the value contained in the hop count field in both messages together. If this sum is not equal to N−1 (where N equals the number of nodes in the braided-ring network), the message was not transmitted by a self-checking pair and the receiving node 102 does not change its operational mode based on the received message if it contains an appropriate change-mode indicator. If the sum is equal to N−1, the receiving node 102 considers the messages to be valid and the receiving node 102 does changes its operational mode based on the received message if it contains an appropriate change-mode indicator.

In other embodiments, other techniques are used to determine if a given message is sourced from a single node or a self-checking pair (for example, "identifier stamping" each such message with an identifier associated with the source of the message).

In one implementation of the embodiment shown in FIG. 3, the current node 102 operates in the new mode for a predetermined period of time and then exits the new mode (for example, by returning to operating in normal mode or by entering a another mode of operation). In another implementation, the current node 102 remains in the new mode until the functionality included the current node 102 causes the current node 102 to exit that new mode (for example, in response to an "exit mode" message or command communicated to the current node 102 in accordance with the communication protocol used during the new mode or upon completion of a particular operation performed in the new mode). In yet another implementation, the current node 102 remains in the new mode until the current node 102 receives an exit mode indicator (or a different new mode indicator) on a plurality of independent links in accordance with method 300 (for example, on both the direct link 108 and skip links 108 of a given channel 0).

In one implementation of the embodiment shown in FIG. 3, each node 102 in the network 100 makes use of link-encryption techniques to verify the integrity of data received on each link 108. In such an implementation, when a node 102 transmits data on a particular link 108, the node 102 encrypts the data using a particular key associated with that link 108. When a node 102 receives data on a link 108, the receiving node 102 decrypts the received data using a key associated with that link 108. For example, when a first node 102 transmits data to a second node 102 on a given link 108, the first node 102 encrypts the data using a particular key associated with that link 108 and the second node 102 decrypts any data it receives on that link 108 using the same key. The second nodes checks the decrypted data (also referred to here as the "plain-text version of the data") to determine if the received data was encrypted using the key associated with that link 108. For example, in one implementation, the plain-text version of the data that is encrypted and transmitted by a non-faulty node will include a predetermined field (for example, located in a preamble or header) in which a predetermine value is stored. The receiving node 102, in such an implementation, looks for the predetermined value in the predetermined field of the plain-text version of the received data. If the predetermined value is missing, the receiving node 102 considers the received data to be faulty. Such link-encryption techniques are described in U.S. patent application Ser. No. 11/551,539 filed on Oct. 20, 2006 and having a title of "FAULT-CONTAINMENT AND/OR FAILURE DETECTION USING ENCRYPTION" (also referred to here as the "'H0009357-5601 Application"), which is hereby incorporated herein by reference. In connection with method 300, the current node 102 will ignore any faulty data in determining whether to change its operational mode.

The embodiment of method 300 shown in FIG. 3 reduces the likelihood that the current node 102 will change its operational mode inappropriately. For example, in the implementation noted above that employs the network 100 of FIG. 3 and that requires the current node 102 to receive the indicator on both the direct link 108 and skip link 108 of either channel 0 or 1 before changing its operational mode, a faulty neighbor of the current node 102 cannot, all by itself, cause the current node 102 to change its operational mode by inappropriately transmitting the indicator to the current node 102 on a direct link 108 of a channel. In such a situation, although the current node 102 receives the indicator from the faulty neighbor on the direct link 108, the current node 102 will not receive the same indicator from its neighbor's neighbor on the skip link 108 and therefore will not change its operational mode.

In one embodiment, the indicator comprises one or more predefined, special-purpose units of data (for example, one or more "enter mode" messages or flags) that indicate to the current node 102 that it should change its operational mode. In another embodiment, the indicator is a pattern or other data-related condition.

In the particular embodiment shown in FIG. 3, method 300 is used to determine when a node should change its operational mode. In one implementation of such an embodiment, the node changes its operational mode by entering a entering a test mode (though it is to be understood that, in other embodiments, the operational mode of a node can be changed to other modes in addition to or instead of to a test mode). Various types of test modes can be implemented in such an implementation (for example, the test modes described above in connection with FIG. 1). In one exemplary implementation, the test mode comprises an "offline" test mode in which the current node 102 does not perform other non-test related processing while in test mode and only test-related data is communicated on the links 108 of the network 100. In another exemplary implementation, the test mode comprises an "online" test mode in which the current node 102 operates as if it where in "normal" mode except that the current node 102 performs various test-related actions while it otherwise is operating in normal mode and test-related messages are communicated over the network 100 among or as "normal" communication traffic. One example of such an online test mode is a "background debug" test mode in which the current node 102 transmits diagnostic data (for example, the state of a particular register within the current node 102) and/or permits the normal mode processing to be altered or controlled, for example, by setting and halting processing in response to breakpoints, watchpoints, and catchpoints and/or by permitting such processing to be "single stepped". In another implementation, the test mode comprises a "one-shot" or "one off" test mode in which a single test or diagnostic operation is performed (for example, a request to get or set the state of a particular register). In other implementations and embodiments, one or more of the foregoing test modes are supported by the current node 102.

In one exemplary implementation of the embodiment shown in FIG. 3, a node 102 is configured so that it enters a test mode (for example, an offline or online test mode) only when it receives an "enter test mode" indicator on both the direct link 108 and skip link 108 of a given channel. When this happens, the node 102 enters the test mode that is associated with the indicator. The fault-tolerant communication paths provided by the network 100 (that is, channel 0 and channel 1) can then be used for communicating test-related data. In this way, separate test buses need not be provided in the network 100 to support test access. Moreover, other fault-tolerant processing can be performed by the current node 102 while operating in test mode (for example, the bit-by-bit comparison functionality described in the '933 application and the '249 application can be used). In this way, such functionality can be leveraged to, for example, increase the fault-tolerance of communications that occur in test mode.

There are many ways in which test commands and test stimulus can be applied to a node under test and test responses can be transmitted by the node under test. In the following description, several exemplary approaches are described. However, it is to be understood that other approaches are used in other embodiments and the following description should not be construed in a limiting sense.

Figure 4A:
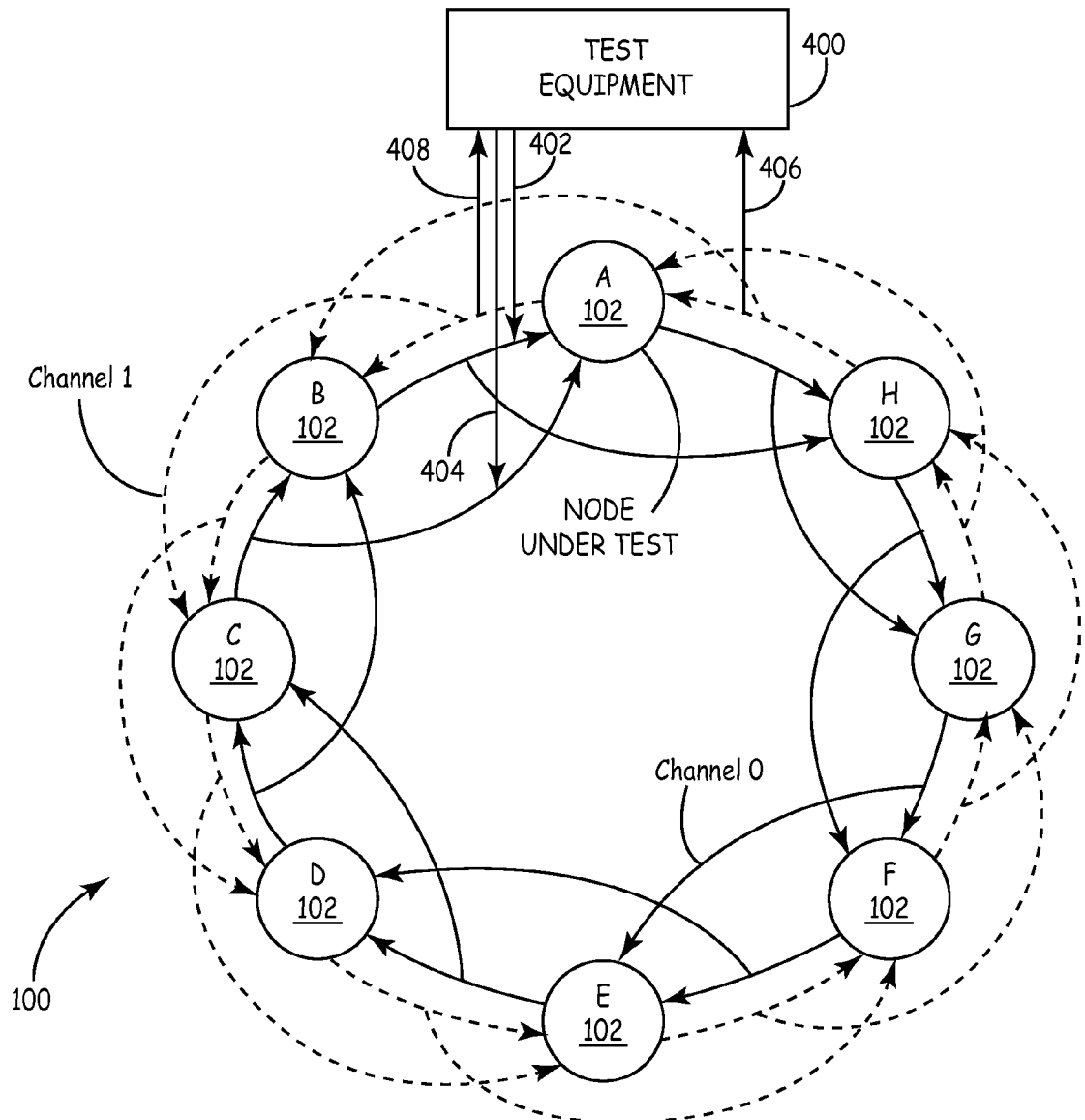
FIGS. 4A-4C illustrate one testing scenario using the network of FIG. 1.
Figure 4B:
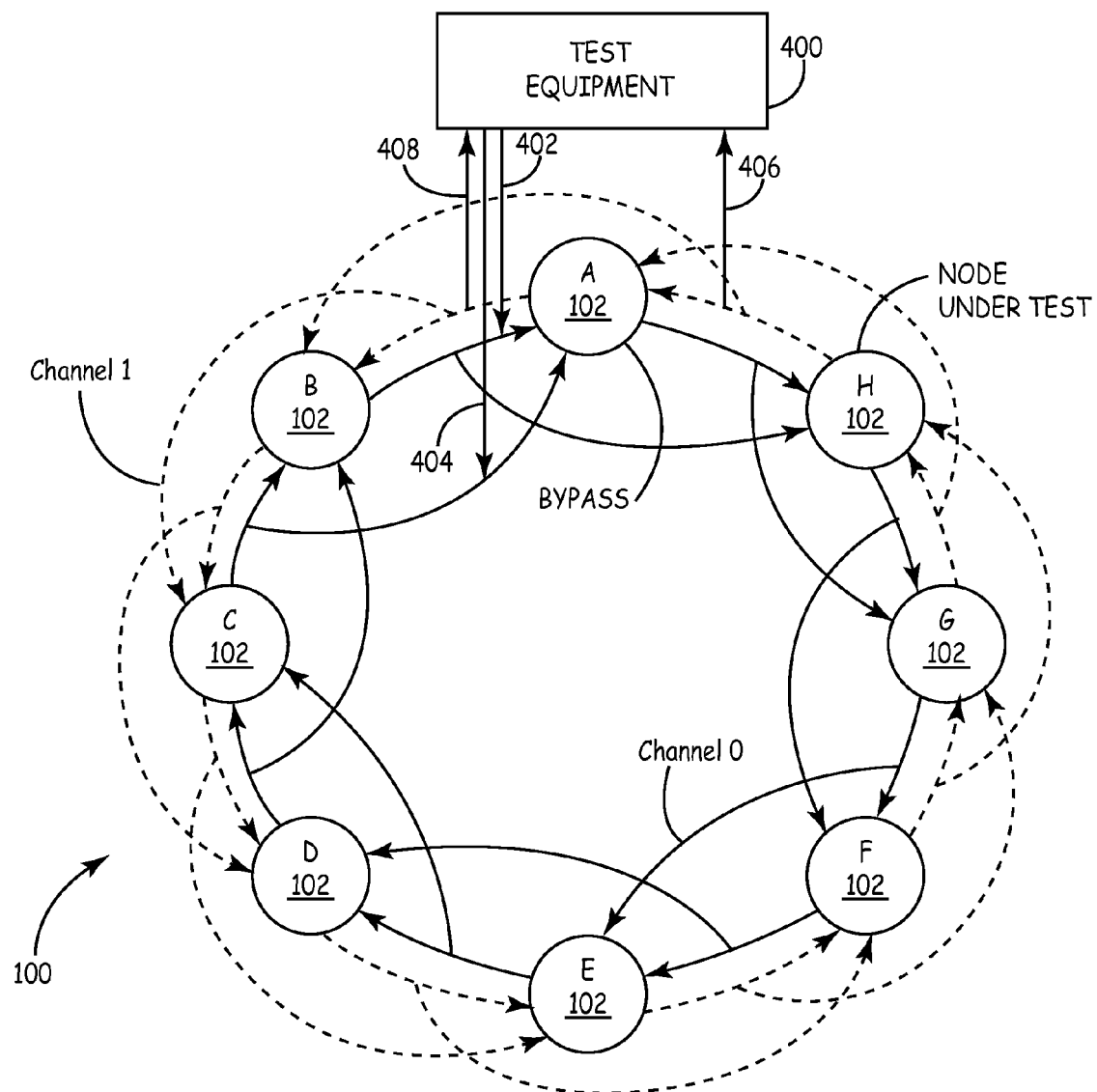
Figure 4C:
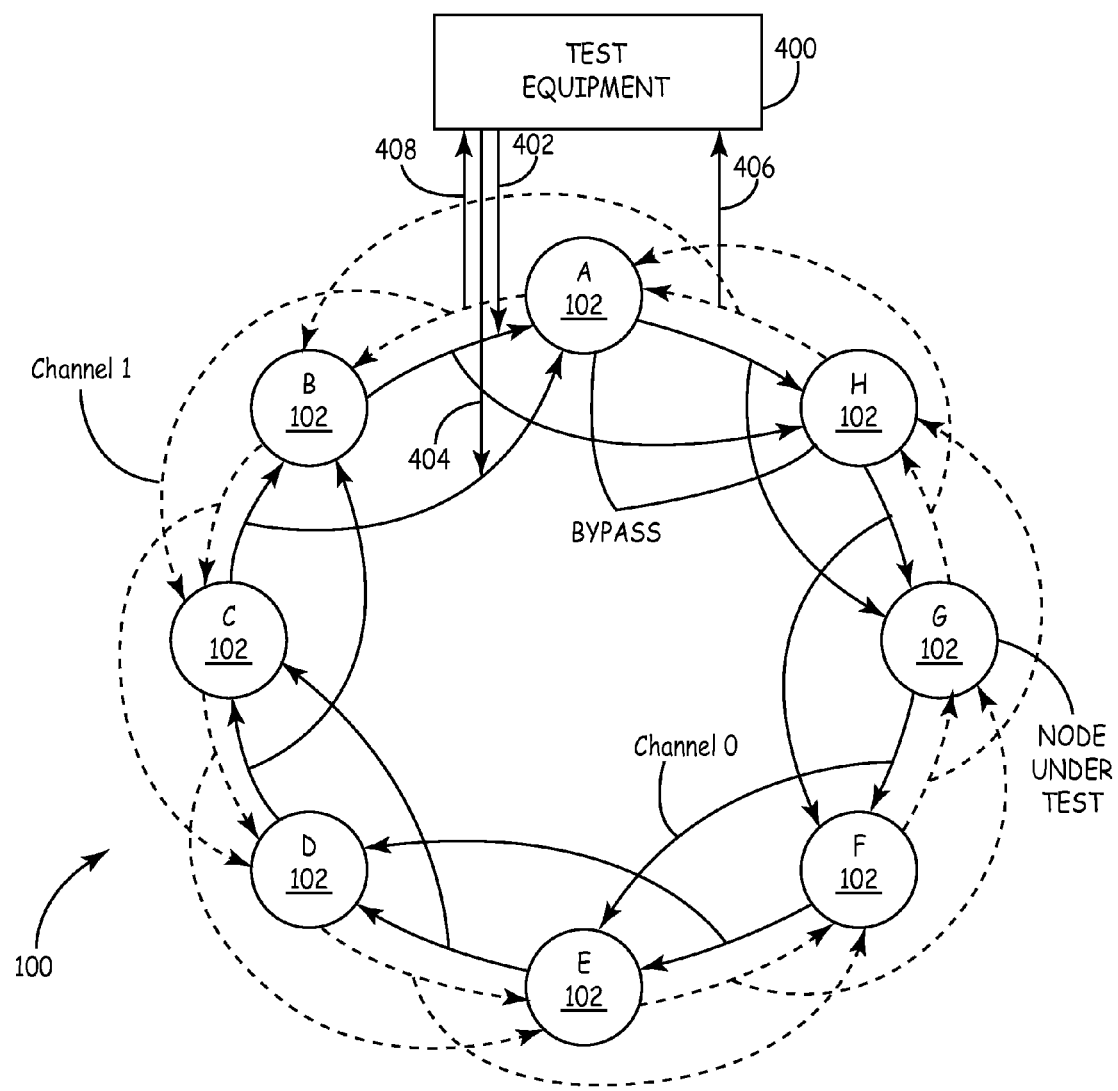

One testing scenario is illustrated in FIGS. 4A-4C using the network 100 of FIG. 1. In the testing scenario illustrated in FIGS. 4A-4C, each of the nodes 102 is implemented as shown in FIG. 2 and implements the processing of method 300 to determine when to enter test mode. The particular test mode illustrated in FIGS. 4A-4C is an offline test mode during which a node communicates only test-related data. In this scenario, test equipment 400 is coupled to one or more of the links 108 of node A in order to successively test nodes A, H, and G. More specifically, the test equipment 400 transmits commands and test stimulus to a particular node under test on channel 0 and receives any test response data from the node under test on channel 1. The test equipment 400 comprises first and second outputs 402 and 404 that, in the testing scenario shown in FIGS. 4A-4C, are coupled to the channel-0 counter-clockwise direct link 108 and skip link 108 of node A, respectively. The test equipment 400 further comprises first and second test inputs 406 and 408 that, in the testing scenario shown in FIGS. 4A-4C, are coupled to the channel-1 clockwise direct link 108 and the channel-1 counter-clockwise direct link 108 for node A, respectively.

In this testing scenario, the nodes 102 of the network 100 initially operate in a normal operational mode. As illustrated in FIG. 4A, the test equipment 400 then outputs an enter test-mode indicator on the first and second test outputs 402 and 404. When and if node A receives the enter test-mode indicator on its counter-clockwise direct link 108 and skip link 108 of channel 0, node A enters test mode. In this particular embodiment, when node A first enters test mode, the interface logic 216 of node A is configured so that node A processes any test commands and/or test stimulus node A receives on its channel-0 counter-clockwise direct link 108 and outputs any test response data on its channel-1 counter-clockwise direct link 108 (that is, node A is configured to be the node under test). The test output data is received by the test equipment 400 on the second test input 408. The test equipment 400 can then process the test output data in accordance with the particular test that is being performed.

Then, in this testing scenario (as illustrated in FIG. 4B), the test equipment 400 outputs a test command on the first and second test outputs 402 and 404 that indicates to node A that the interface logic 216 should be configured in a "bypass" configuration so that all communications received by node A on channel 0 or channel 1 are forward along the respective channel without processing by node A. Then, after the interface logic 216 of node A is in a bypass configuration, the test equipment 400 outputs the enter test mode indicator on the first and second test outputs 402 and 404. Node A forwards the received enter test-mode indicator received on channel 0 along channel 0 to node H on its channel-0 clockwise direct and skip links 108. When and if node H receives the enter test-mode indicator on its counter-clockwise direct link 108 and skip link 108 of channel 0, node H enters test mode. In this particular embodiment, when node H first enters test mode, the interface logic 216 of node H is configured so that node H processes any test commands and/or test stimulus node H receives on its channel-0 counter-clockwise direct link 108 and outputs any test response data on its channel-1 counter-clockwise direct link 108 (that is, node H is configured to be the node under test). Node A forwards any test response data it receives on channel 1 from node H along channel 1 to the test equipment 400. The test response data is received by the test equipment 400 on the second test input 408. The test equipment 400 can then process the test response data in accordance with the particular test that is being performed.

Then, in this testing scenario (as illustrated in FIG. 4C), the test equipment 400 outputs a test command on the first and second test outputs 402 and 404, which is forwarded by node A to node H on channel 0. The test command is received by node H and indicates to node H that its interface logic 216 should be configured in a "bypass" configuration so that all communications received by node H on channel 0 or channel 1 are forward along the respective channel without processing by node H. Then, after the interface logic 216 of node H is in a bypass configuration, the test equipment 400 outputs the enter test mode indicator on the first and second test outputs 402 and 404. Node A forward the received enter test-mode indicator received on channel 0 along channel 0 to node H on its channel-0 clockwise direct and skip links 108, and Node H forward the received enter test-mode indicator received on channel 0 along channel 0 to node G on its channel-0 clockwise direct and skip links 108. When and if node G receives the enter test-mode indicator on its counter-clockwise direct link 108 and skip link 108 of channel 0, node G enters test mode. In this particular embodiment, when node G first enters test mode, the interface logic 216 of node G is configured so that node G processes any test commands and/or test stimulus node G receives on its channel-0 counter-clockwise direct link 108 and outputs any test response data on its channel-1 counter-clockwise direct link 108 (that is, node G is configured to be the node under test). Node H forwards any test response data it receives on channel 1 from node G along channel 1 to node A. Node A forwards any test response data it receives on channel 1 from node H along channel 1 to the test equipment 400. The test response data is received by the test equipment 400 on the second test input 408. The test equipment 400 can then process the test response data in accordance with the particular test that is being performed.

Such processing can proceed around the rest of the ring in order to test nodes F, E, D, C, and B in the same manner as described above in connection with FIGS. 4A-4C. When the test is completed, the test equipment 400, in one implementation, outputs a test command to each of the nodes (in reverse order) that indicates that the node should exit test mode and return to normal operational mode. In another implementation, the nodes 102 return to normal operational mode after a predetermined amount of time has elapsed (for example, since the entering test mode change).

Figure 5A:
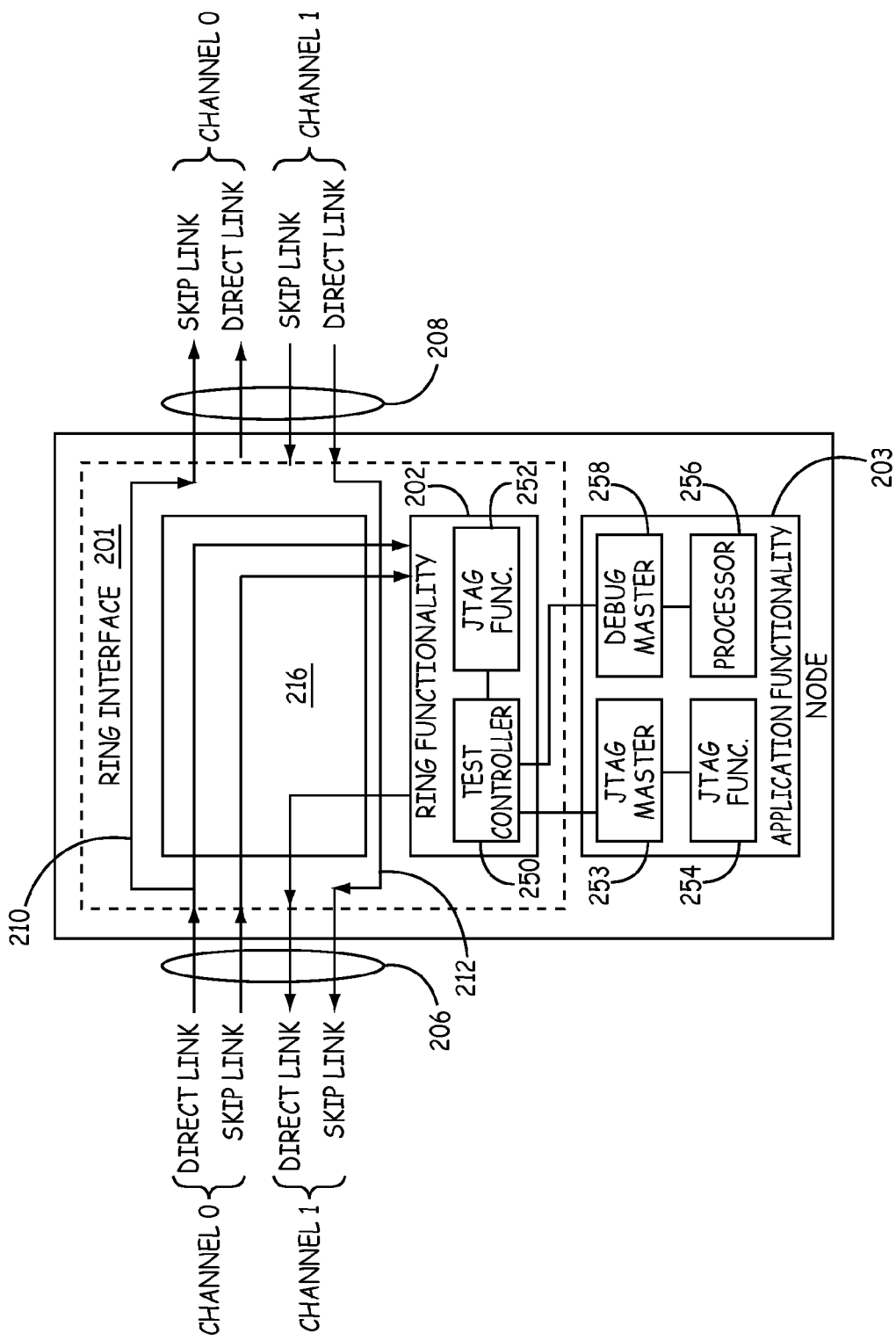
FIGS. 5A-5B are block diagrams illustrating the operation of the node of FIG. 2 while operating in test mode.
Figure 5B:
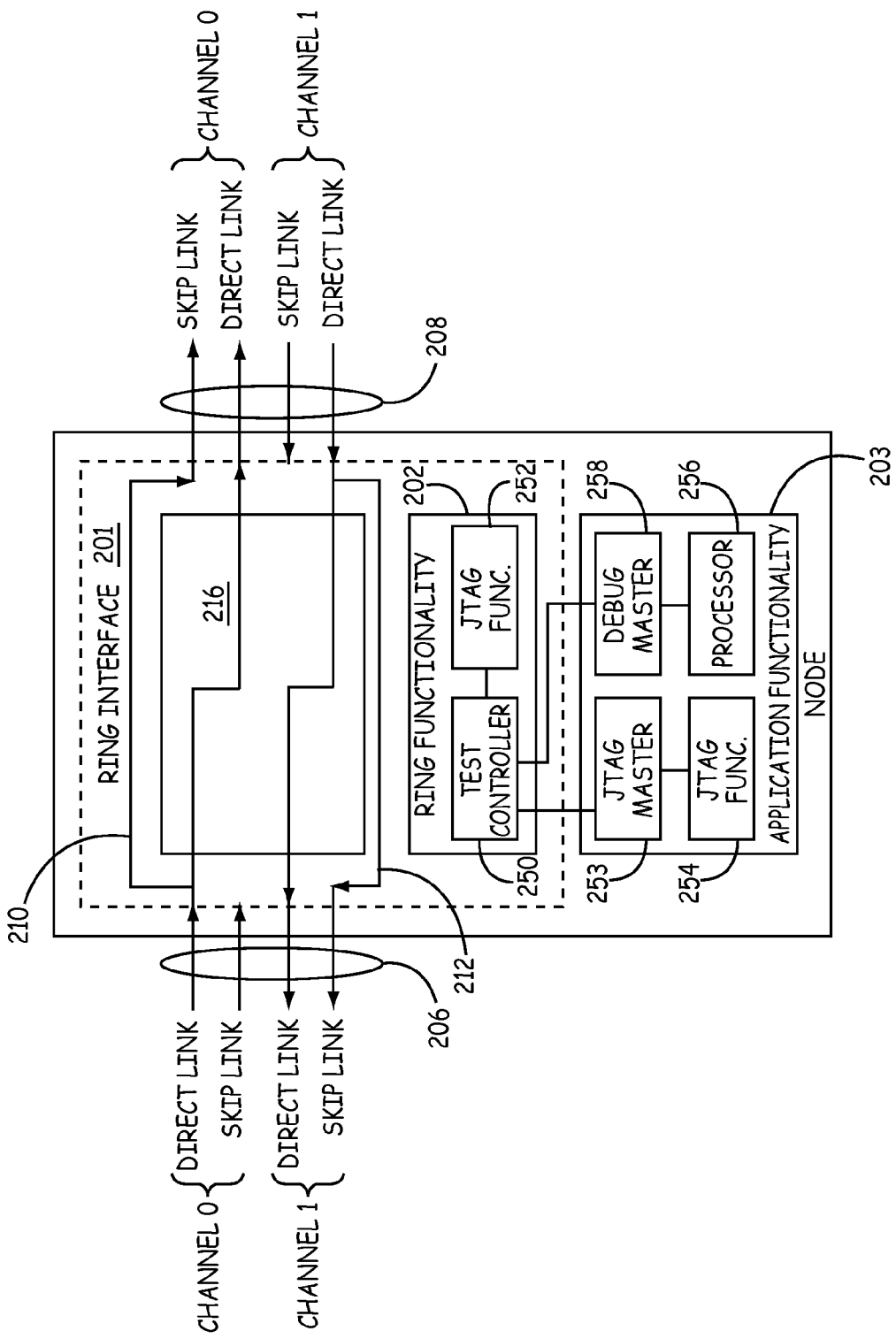

FIGS. 5A-5B are block diagrams of the node 102 of FIG. 2 while operating in test mode. This node 102 is referred to here in the context of FIGS. 5A-5B as the "current" node 102 and is described as operating in the test scenario shown in FIGS. 4A-4C (though it is to be understood that other embodiments are implement in other ways). In the particular embodiment shown in FIG. 5A-5B, the ring functionality 202 comprises a test controller 250 that, when the current node 102 is in test mode, receives test input data from channel 0 (via the interface logic 216). In one implementation of such an embodiment, the test controller 250 processes any test commands it receives on channel 0, applies any test stimulus it receives on channel 0 to the appropriate component of the current node 102, and receives test responses from components of the current node 102 and transmits the test response on channel 1.

FIG. 5A shows the interface logic 216 of the current node 102 configured so that the current node 102 is the node under test. When the current node 102 is the node under test, the interface logic 216 couples the counter-clockwise direct link 108 and skip link 108 of channel 0 to respective inputs of the test controller 250 and couples the counter-clockwise direct link 108 of channel 1 to a respective output of the test controller 250. In the particular example shown in FIG. 5A, any test input data received on channel 0 from the test equipment 400 (via any intermediary nodes) is received at the test controller 250. The test controller 250 also transmits any test response data on channel 1 back to the test equipment 400 (via any intermediary nodes).

FIG. 5B shows the interface logic 216 of the current node 102 in the bypass configuration described above in connection with FIGS. 4B-4C. When the interface logic 216 of the current node 102 is in the bypass configuration, the interface logic 216 couples the counter-clockwise direct link 108 of channel 0 to the clockwise direct link 108 of channel 0 and couples the clockwise direct link 108 of channel 1 to the counter-clockwise direct link 108 of channel 1. Also, the channel-zero pass-through link 210 couples the counter-clockwise direct link 108 of channel 0 to the clockwise skip link 108 of channel 0 and the channel-one pass-through link 212 couples the clockwise direct link 108 of channel 1 to the counter-clockwise skip link 108 of channel 1.

While the interface logic 216 of the current node 102 is in the bypass configuration, any data received on the counter-clockwise direct link 108 of channel 0 is communicated on both the clockwise direct link 108 of channel 0 to the current node's clockwise neighbor and the clockwise skip link 108 of channel 0 to the current node's clockwise neighbor's neighbor and any data received on the clockwise direct link 108 of channel 1 is communicated on both the counter-clockwise direct link 108 of channel 1 to the current node's counter-clockwise neighbor and the counter-clockwise skip link 108 of channel 1 to the current node's counter-clockwise neighbor's neighbor. For example, as shown in FIG. 4C, node H (while the interface logic 216 of the current node 102 is in the bypass configuration) receives and relays test input data output by the test equipment 400 on channel 0 and receives and relays test output data generated by node G on channel 1 as described above in connection with FIG. 4C.

In the particular embodiment shown in FIGS. 5A-5B, the current node 102 implements at least a portion of the functionality specified in the Institute of Electrical and Electronic Engineers (IEEE) 1149 family of standards (also referred to here as "JTAG"). In such an embodiment, the ring functionality 202 comprises JTAG functionality 252 (also referred to here more generally as "boundary-scan functionality" 252) and the application functionality 203 comprises JTAG functionality 254 (also referred to here more generally as "boundary-scan functionality" 254) that the test controller 250 interacts with via a JTAG master 253. In such an embodiment, the JTAG functionality 252 and 254 implement a conventional JTAG interface (also referred to here as a "JTAG test access port" or "TAP"). This JTAG interface includes four lines: a test data in (TDI) input line, a test clock (TCK) input line, a test mode signal (TMS) input line and a test data out (TDO) output line. The JTAG functionality 252 and 254 comprises appropriate functionality to respond to control sequences supplied through the JTAG TAP, generates internal clock and control signals required for correct operation of the JTAG functionality 252 and 254, an instruction register that can be loaded with an instruction that selects an operation to be performed by the JTAG functionality 252 and 254, data registers into which stimuli required by a given operation are loaded and from which results of a given operation can be read after performing the operation, and one or more boundary scan cells for causing such operations to be performed using such stimuli and, if appropriate, capturing appropriate results.

The test controller 250 serves as bridge between the JTAG TAP of the JTAG functionality 252 and 254 and the rings over which test command, stimulus, and response data are communicated. In one simple exemplary implementation of such an embodiment, the test commands and stimulus (collectively "test input data") are communicated to the current node 102 in 4-bit packets of data on channel 0. The most significant bit of each packet indicates whether the particular bit is a simple JTAG packet or a high-level command packet. If the most significant bit indicates that a particular packet is a simple JTAG packet, then the three least significant bits comprise the TDI, TMS, and TCK bits for a given point in time and the test controller 250 applies these bits to the lines of the JTAG TAP for the JTAG functionality 252 or 254. If the most significant bit indicates that a particular packet is a high-level command packet, then the three least significant bits represent a particular high-level command. Examples of such commands include commands that cause the interface logic 216 of the current node 102 to be configured in the bypass configuration, that select whether to test the JTAG functionality 252 of the ring functionality 202 or the JTAG functionality 254 of the application functionality 203, that cause the current node 102 to enter a "background debug" mode or to carry out one or more debug commands. The test controller 250 also transmits the TDO output line of the JTAG TAP for the JTAG functionality 252 or 254 on channel 1.

In one implementation of such an embodiment, the JTAG functionality 252 or 254 is selected for testing by interacting with a special test control register included in the JTAG functionality 252 of the ring functionality 202. In such an implementation, the selection of which JTAG functionality 252 or 254 is selected as a part of the JTAG boundary scan. In another implementation, the JTAG functionality 252 or 254 is selected for testing using a high-level command of the type described above that is communicated to the test controller 250. In other implementations, such selection is carried out in different ways.

In such an implementation, when simple JTAG packets are received at the current node 102 from test equipment 400 (not shown in FIGS. 5A-5B) on channel 0, the test controller 250 extracts each of the three bits associated with each of the three input lines of the JTAG interface and applies each such bit to a respective input line of the JTAG TAP for the JTAG functionality 252 or 254 (depending on which one has been selected for testing). In such an implementation, the test controller 250 periodically reads the one output line of the selected JTAG TAP (that is, the TDO output line) and communicates that bit on channel 1 back to the test equipment 400. In this way, the test equipment 400 can communicate with the JTAG functionality 252 or 254 of the current node 102 via the normal data links of the network 100 and additional testing connectivity need not be provided.

In one implementation of such an embodiment, the behavior of each of the nodes 102 in the network 100 is characterized using a standard boundary-scan description (for example, using a boundary-scan description language (BSDL), hierarchical scan-description language (HSDL), or serial vector format (SVF)).

In one implementation, other JTAG features are used in test mode. Examples of such other JTAG features include running high-level test commands such as BIST and using the JTAG interface as a loading mechanism to load data and/or software onto the node 102 (for example, loading communication table data used by the ring functionality 202 or loading application software, boot-strap software, or test software used by the application functionality 203). In one testing scenario, such a loading mechanism is used to load software that performs one or more functional tests, which provides a way to perform software functional tests in addition to (or instead of) JTAG structural boundary-scan tests.

In the embodiment shown in FIGS. 5A-5B, the application functionality 203 of the current node 102 also includes at least one programmable processor 256 that implements a background debug mode (BDM) that supports, for example, breakpoints, watchpoints, and/or catchpoints and remote debugging of the processor 256 (for example, using a debugger running on the test equipment 400). In the particular embodiment shown in FIGS. 5A-5B, debugging commands and results can be communicated to and from the processor 256 in two ways. One way is to format such commands and results as JTAG test data for communication over channels 0 and 1 in the manner described above in connection with the JTAG functionality 252 or 254 (that is, the processor 256 is included in the JTAG functionality 254). The processor 256 includes an appropriate JTAG TAP (and associated JTAG controller) for receiving debug commands on the JTAG input lines and for outputting results on the JTAG output line.

The other way in which debug commands and results are communicated to and from the processor 256 makes use of a debug port (for example, a NEXUS or background debug mode (BDM) port). The application functionality 203 comprises a debug master 258 for communicating with the processor 256 over the debug port. In one implementation of such an embodiment that makes of a NEXUS interface and a NEXUS master, NEXUS test input data is supplied to the current node 102 from test equipment 400 on channel 0 in a serial form in which successive frames of data containing a bit to be applied to each of the input lines of the NEXUS interface. The test controller 250 serves as a bridge between channel 0 and the debug master 258. When the current node 102 is operating in test mode (and is the interface logic 216 is not in the bypass configuration) and such NEXUS test-input data is received at the current node 102 from channel 0, the test controller 250 recognizes the received test input data as NEXUS test input data and extracts each of the bits associated with each of the input lines of the NEXUS interface and applies each such bit to a respective input line of the debug port of the debug master 258. In such an implementation, the test controller 250 periodically reads the output lines of the debug port and formats successive frames of data containing a bit for each of the output lines of the NEXUS debug port and communicates the frames on channel 1 back to the test equipment 400.

The debug functionality of the processor 256 can be tested using, for example, at least two approaches (though other approaches are possible). In one approach, the debug functionality of the processor 256 is used while the current node 102 is in an offline test mode in which only test-related messages are communicated on the network 100. Such messages are communicated as described above.

In another approach, the debug functionality of the processor 256 is used while the current node 102 is in an "online" test mode in which the current node 102 operates as if it where in "normal" mode except that the current node 102 performs various test-related actions while it otherwise is operating in normal mode and test-related messages are communicated over the network 100 among or as "normal" communication traffic. In such an embodiment, debug commands are sent to the current node 102 as or among normal messages. The test controller 250 identifies those messages containing debug commands and extracts the debug commands from the messages and forwards the debug commands to the processor 256 for performing the debug command (or the test controller 250 other causes the processor 256 to perform a debug operation associated with the extracted debug command). Any debug-related output data that the processor 256 produces is forwarded to the test controller 250 for communicating on the network 100 among or as normal messages. In one implementation of such an approach, the test controller 250 maintains debug-message buffer memory into which debug commands and debug output are passed between the test controller 250 and the debug master 258 (which serves as the interface to the processor 256). In one implementation of such an approach that is implemented in a network 100 that makes use of a TDMA access scheme, debug-related messages are communicated during one or more predetermined time slots that have been selected for communicating such messages. In another implementation of such an approach, the network 100 supports an asynchronous messaging capability in which a priority is assigned a priori to each node 102 in the network 100 and in which collisions are resolved using the priority assigned to each node.

Such an online debugging approach can also be used to debug multiple processors in the network 100. For example, such an approach can be used to set breakpoints on multiple processors within the network 100. Such an approach can also be used to observe detailed processor behavior (for example, to assist with WCET profiling of the entire network 100).

Also, such test and debugging functionality can be employed to remove dedicated processor boot load functionality from the nodes 102. Where this is the case, the ring functionality 202 (that is, the ring communication engine) starts autonomously since the ring functionality 202 is used to boot-strap the processor 256. That is, the processor 256 does not turn on the ring functionality 202; instead, the ring functionality 202 will immediately power itself up upon powering on the current node 102 and/or will respond to wake-up messages received from the network 100. Once powered on, the ring functionality 202 interacts with an external device that supplies the software load using the test/debug functionality of the current node 102 in order to boot-strap the processor 256.

Figure 6:
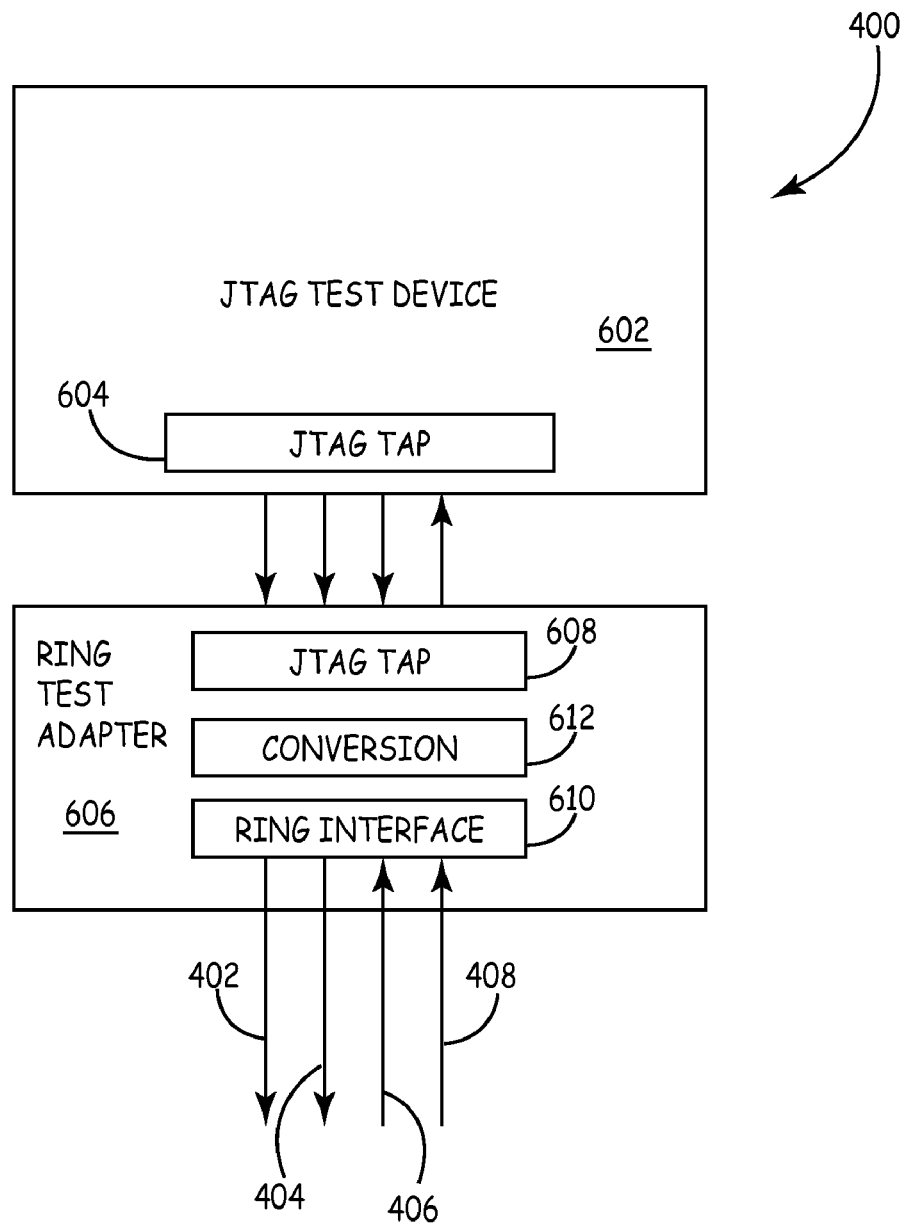
FIG. 6 is a block diagram of one embodiment of test equipment.

FIG. 6 is a block diagram of one embodiment of test equipment 400. The embodiment of test equipment 400 shown in FIG. 6 is described here as being used in the testing scenarios illustrated in FIGS. 4A-4C. The test equipment 400 comprises one or more conventional JTAG test devices 602 that are designed to interact with a device under test using a JTAG TAP 604. The test equipment 400 further comprises a ring test adapter 606 that includes a JTAG TAP 608 that communicatively couples the ring test adapter 606 to the JTAG TAP of the JTAG test device 602. The ring test adapter 606 further comprises a ring interface 610 that communicatively couples the ring test adapter (and the JTAG test device 602) to the network 100. In the embodiment shown in FIG. 6, the ring interface 610 comprises the first and second outputs 402 and 404 that, in the testing scenario shown in FIGS. 4A-4C, are coupled to the channel-0 counter-clockwise direct link 108 and skip link 108 of node A, respectively. The ring interface 610 further comprises the first and second test inputs 406 and 408 that, in the testing scenario shown in FIGS. 4A-4C, are coupled to the channel-1 clockwise direct link 108 and the channel-1 counter-clockwise direct link 108 for node A, respectively.

The ring test adapter 606 further comprises conversion functionality 612 that "packetizes" the TDI, TMS, and TCK lines from the JTAG TAP that output by the JTAG test device 602. That is, the conversion functionality assembles simple JTAG packets of the type described above in connection with FIGS. 5A-5B and communicates them on channel 0 of the network 100 (in the particular embodiment shown in FIG. 6). The conversion functionality also applies any test response data received on channel 1 of the network 100 to the TDO line of the JTAG TAP of the JTAG test device 602. In this way, the ring test adapter 606 serves as a bridge between the conventional JTAG test device 602 and the rings of the network 100.

In other embodiments, test equipment is communicatively coupled to the network 100 in other ways.

Although in the embodiments described above in connection with FIGS. 4A-4C, 5A-5B, and 6, test equipment transmits commands and test stimulus to a particular node under test on channel 0 and receives any test response data from the node under test on channel 1 it is to be understood that data can be communicated in other ways. For example, in one alternative embodiment using a ring topology, test equipment transmits commands and test stimulus on a particular channel (for example, channel 0) in a particular direction (for example, a clockwise direction) and the transmissions are propagated around the ring on that channel. Thereafter, the nodes transmit any test response data on that same channel (for example, channel 0) in the same direction (for example, a clockwise direction) and the transmissions propagate around the ring on that channel back to the test equipment, where the transmissions are received.

The systems, devices, methods, and techniques described here may be implemented in networks having network topologies other than the particular braided-ring topology illustrated in FIG. 1. For example, at least some of the systems, devices, methods, and techniques described here may be implemented in networks in which additional inter-node connections are provided between the various nodes of the network. One example of such a network is a "mesh" network. In one example of such a mesh embodiment, each node is communicatively coupled to all the other nodes in the network 100 (in the case of a "full" mesh network topology) or a subset of the other nodes in the network (in the case of a "partial" mesh network topology). For each such node, and for a given flow of data within a given channel defined in such a mesh network, at least a subset of the nodes to which that node is coupled are designated as receive-from nodes for that node and at least a subset of the nodes to which that node is coupled are designated as transmit-to nodes.

The methods and techniques described here may be implemented in digital electronic circuitry, or with a programmable processor (for example, a special-purpose processor or a general-purpose processor such as a computer) firmware, software, or in combinations of them. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed application-specific integrated circuits (ASICs).

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

What is claimed is:

1. A node comprising:
an interface to communicatively couple the node to a plurality of independent communication links;
wherein the node changes the mode in which the node operates when the node receives an indicator on each of at least a subset of the plurality of the independent communication links, wherein the at least a subset of the plurality of independent communication links includes more than one of the plurality of independent communication links and wherein the same indicator is received on each of the at least a subset of the plurality of the independent communication links.

2. The node of claim 1, wherein the node changes the mode in which the node operates when one of the following occurs:
the node receives the indicator on all of the independent communication links to which the interface is communicatively coupled; and
the node receives the indicator on less than all of the independent communication links to which the interface is communicatively coupled.

3. The node of claim 1, wherein the node changes the mode in which the node operates when the node receives the indicator on a predefined set of independent communication links to which the interface is communicatively coupled that is less than all of the independent communication links to which the interface is communicatively coupled.

4. The node of claim 1, wherein the interface communicatively couples the node to a first link that is communicatively coupled to a first node and to a second link that is communicatively coupled to a second node, wherein the node changes the mode in which the node operates when the node receives the indicator on both the first link and second link within a predefined amount time.

5. The node of claim 1, wherein the node changes the mode in which the node operates by having the node operate in at least one of an offline test mode and an online test mode.

6. The node of claim 5, further comprising at least one of: boundary-scan functionality and a test controller.

7. The node of claim 1, further comprising a processor including debug functionality, wherein the node changes the mode in which the node operates by having the node operate in a debug mode.

8. The node of claim 7, wherein the debug mode supports a background debug mode.

9. The node of claim 1, further comprising a processor, wherein the node changes the mode in which the node operates by having the node operate in a mode in which at least one of the following is loaded: software to be executed by the processor and data to be used by the processor.

10. The node of claim 1, wherein the node is a part of network having a ring topology, wherein the node changes the mode in which the node operates by entering a test mode in which the node receives test input data from the ring, wherein the test input data is communicated in a first direction around the ring.

11. The node of claim 10, wherein the node transmits test output data while in the test mode along the ring, wherein the test output data is communicated around the ring in the first direction.

12. The node of claim 10, wherein the network comprises two rings and the node, while in the test mode, receives test input data from one of the rings and transmits test output data along the other of the rings.

13. The node of claim 1, wherein the interface comprises interface logic to configure the interface in a bypass configuration in which information received at the node is forwarded to another node.

14. The node of claim 1, wherein the node changes the mode in which the node operates by doing one of: having the node enter an operational mode associated with the indicator and having the node exit an operational mode associated with the indicator.

15. The node of claim 1, wherein the node is included in a network having at least one of: a ring topology, a braided ring, and a mesh topology.

16. The node of claim 1, wherein the indicator comprises at least one of: a predefined message and a predefined flag.

17. The node of claim 1, wherein the node changes the mode in which the node operates by having the node enter an operational mode associated with the indicator, wherein the node exits the operational mode when at least one of the following occurs: the node receives a second indicator associated with exiting the operational mode and a predetermined amount of time has elapsed since entering the operational mode.

18. A method performed at a node, the method comprising:
   determining if the node has received an indicator on a plurality of independent communication links to which the node is communicatively coupled; and
   changing the mode in which the node operates when the node receives the indicator on each of at least a subset of the plurality of independent communication links, wherein the at least a subset of the plurality of independent communication links includes more than one of the plurality of independent communication links and wherein the same indicator is received on each of the at least a subset of the plurality of the independent communication links.

19. The method of claim 18, wherein changing the mode in which the node operates when the node receives the indicator on the plurality of independent communication links comprises one of: having the node enter an operational mode associated with the indicator and having the node exit an operational mode associated with the indicator.

20. A network comprising:
   a plurality of nodes that are communicatively coupled to one another over first and second channels;
   wherein the first channel communicatively couples each node to:
      a respective first direct link that is communicatively coupled to a respective first neighbor node of that node in a first direction;
      a respective first skip link that is communicatively coupled to a respective first neighbor's neighbor node of that node in the first direction;
      a respective second direct link that is communicatively coupled to a respective second neighbor node of that node in a second direction; and
      a respective second skip link that is communicatively coupled to a respective second neighbor's neighbor node of that node in the second direction; and
   wherein the second channel communicatively couples each node to:
      a respective third direct link that is communicatively coupled to the respective first neighbor node of that node in the first direction;
      a respective third skip link that is communicatively coupled to the respective first neighbor's neighbor node of that node in the first direction;
      a fourth direct link that is communicatively coupled to the second respective neighbor node of that node in the second direction; and
      a fourth skip link that is communicatively coupled to the respective second neighbor's neighbor node of that node in the second direction;
   wherein each node further comprises:
      a first pass-through link that communicatively couples the respective first direct link of that node to the respective second skip link of that node; and
      a second pass-through link that communicatively couples the respective third direct link of that node to the respective fourth skip link of that node;
   wherein, for each node, a respective first cable couples that node to the respective first neighbor node of that node and comprises the respective first direct link, the respective first skip link, the respective third direct link, and the respective third skip link and a respective second cable couples that node to the respective second neighbor node of that node and comprises the respective second direct link, the respective second skip link, the respective fourth direct link, and the respective fourth skip link.

* * * * *